United States Patent [19]

Gonsalves

[11] Patent Number: 4,842,641
[45] Date of Patent: Jun. 27, 1989

[54] SYNTHESIS OF IRON-COBALT POWDERS

[75] Inventor: Kenneth E. Gonsalves, Hoboken, N.J.

[73] Assignee: GAF Corporation, Wayne, N.J.

[21] Appl. No.: 183,931

[22] Filed: Apr. 20, 1988

[51] Int. Cl.$^4$ .................. C01G 51/02; C22C 1/00; C22B 5/20
[52] U.S. Cl. .................. 75/0.5 AA; 75/0.5 BA; 75/251; 423/417
[58] Field of Search ............ 75/0.5 AA, 0.5 BA, 251; 423/417, 418

[56] References Cited

U.S. PATENT DOCUMENTS

| | | | |
|---|---|---|---|
| 3,330,629 | 7/1967 | Parshall | 423/417 |
| 3,332,749 | 7/1967 | Natta et al. | 423/417 |
| 3,793,437 | 2/1974 | Takasu et al. | 423/417 |
| 4,408,069 | 10/1983 | Doyle | 423/417 |

*Primary Examiner*—L. Dewayne Rutledge
*Assistant Examiner*—David Schumaker
*Attorney, Agent, or Firm*—Richard T. Laughlin; Anthony Lagani, Jr.; Joshua J. Ward

[57] ABSTRACT

This invention is directed to the preparation of Iron-cobalt powders by reacting iron tricobalt hydrido dodecacarbonyl with iron pentacarbonyl and pyrolyzing the resulting metal-organic iron cobalt clusters.

16 Claims, No Drawings

SYNTHESIS OF IRON-COBALT POWDERS

This invention relates to the synthesis of intermetallic alloy powders and particularly to iron-cobalt powders.

BACKGROUND OF THE INVENTION

Transition-metal cluster compounds have been under scrunity because of their potential catalytic applications. Such clusters are of interest from three perspectives. The first is that they should prove of value as precursors for the preparation of bimetallic and multimetallic heterogeneous catalysts. Such catalysts can be prepared by allowing clusters to absorb on to catalyst supports as $SiO_2$ and $Al_2O_3$, followed by pyrolysis to remove the ligands. The second perspective is that mixed-metal clusters may find application in homogeneous catalysts because of the different reactivities of the metals present in the clusters which may show reactivity patterns different from those of homometallic clusters. Thirdly, the low symmetry of mixed-metal clusters makes them useful for probing various aspects of the reactivity and molecular dynamics of clusters.

Mixed-metal clusters are described by W. I. Gladfelter and G. I. Geoffroy in an article entitled "Mixed-Metal Clusters" appearing in Advances in Organometallic Chemistry, Vol. 18, page 207, G. A. Stone and R. West Editors, Academic Press, New York 1980. There are four general methods for preparing mixed-metal clusters. These are by pyrolysis, addition to coordinately unsaturated compounds, redox condensations and reaction of carbonylmetals with metal halides. Pyrolysis reactions generally involve heating two or mroe stable compounds of different metals to give fragments that then combine to yield the mixed-metal clusters. The addition of coordinatively unsaturated compounds is closely related to the pyrolysis technique and are presumably formed during pyrolysis by dissociation of ligands or cleavage of metal-metal bonds. The redox condensation is the reaction of a carbonylmetalate with a neutral metal carbonyl and has been widely used as a pyrolysis reaction for synthesizing mized-metal clusters. In the reaction of carbonylmetalates with metal halides the carbonylmetalates will displace a halide complex to yield a metal-metal bonded species.

THE OBJECTS OF THE INVENTION

It is an object of the invention to provide a simple and effective means of synthesizing iron-cobalt intermetallics. It is another object of the invention to vary the ratio of iron to cobalt in such intermetallics. It is a further object of the invention to provide a method to produce homogeneous products of reduced particle size. A still further object of the invention is the synthesis of iron-cobalt metal-organic clusters as precursors for the production of intermetallics (alloys). Other objects and the advantages of the invention will appear from the following detailed description.

THE SUMMARY OF THE INVENTION

It has been discovered that iron-cobalt powders of control iron-cobalt ratios can be obtained by reacting iron pentacarbonyl ( $Fe(CO)_5$ ) with $HFeCo_3(CO)_{12}$ (iron tricobalt hydrido dodecacarbonyl) under controlled conditions of temperature and pressure to produce metal-organic clusters followed by the pyrolysis of the metal-organic iron-cobalt clusters to form the intermetallic alloy powder.

THE DETAILED DESCRIPTION OF THE INVENTION

In accordance with the invention it has been discovered that intermetallic alloy powders with ratios of iron to cobalt of about 2 to 1 can be produced by reacting $HFeCo_3(CO)_{12}$ with iron pentacarbonyl under controlled conditions of heat and pressure and then subjecting the resulting metal organic clusters to pyrolysis. The product is obtained in high yield in fine particle size. The ratio of reactants is from about 0.06 to about 0.05, $HFeCo_3(CO)_5$: $Fe(CO)_5$. The reaction is preferably carried out at a temperature range of about 80° to about 1000° C. and at a pressure of about 1 atmosphere to about 2 atmospheres, with temperatures of about 200° to 350° C. at atmospheric pressure being preferred. It has also been discovered that the iron content of cluster particles can be increased by raising the initial reaction temperature to a range of about 130° C. to 150° C. This higher reaction temperature also results in finer particle size. It is known that iron pentacarbonyl decomposes thermally at approximately 130° C. to iron. The compound $HFeCo_3(CO)_{12}$ when mixed with iron pentacarbonyl and heated in an argon atmosphere for 45 minutes at 80° C. followed by removal of the unreacted iron pentacarbonyl, results in a black solid residue. When this residue is subjected to pyrolysis at 350° C. for one hour it yields a homogeneous powder of average iron to cobalt ratio of approximately 1 to 3.

The processes of the invention are conducted in an inert gas such as in argon or nitrogen using Schlenk techniques. The apparatus is preferably freshly assembled immediately after removal from a hot oven and subjected to repeated evacuation and purging with an inert gas. Prepurified gas can be dried over concentrated sulfuric acid, phosphoros pentoxide and then residual oxygen removal by the utilization of a BASF catalyst. When preparing the starting material from acetone thereafter should be purified by refluxing with successive small quantities of potassium permanganate until the violet color persists. The purified acetone is then dried with anhydrous calcium sulfate, filtered from the disiccant and fractionated under an inert gas. It is also preferred that the distilled water he deoxygenated by boiling for 10 hours followed by cooling under a strea of inert gas. The toluene and hexane utilized is dried by refluxing over calcium hydride. Pyrolyses is preferably conducted in a quartz combustion tube in a tube furnace inter-faced with a microprocessor controller.

The following examples are given for purpose of illustration. In these examples infra-red spectra were recorded on a Perkin Elmer 983 spectrometer interfaced with a data station. $^1H$ NMR spectra were recorded on a 200 MHz Bruker spectrometer. Pyrolyses were conducted in a quartz combustion tube in a tube furnace interfaced with a microprocessor controller. All X-ray powder diffraction measurements were carried out by means of a General Electric Diffractometer. A copper anode tube was used as the X-ray source. The powder sample for XRD studies was finely ground and annealed to relieve residual stresses and nullify the effect of preferred orientation. The particles were classified by means of a sieve and those less than 40 (um) in size were used for diffractometer studies. A beam slit of 1° and detection slit of 0.05° was used to provide high resolution conditions. An acceleration voltage of 35 eV, beam current of 15 mA and a scanning speed of 0.2° per minute were used. The specimen was scanned from $2\theta = 8°$ to $160°$. Sharp and symmetric (Gaussian distribution) diffraction peaks indicated that the sample is crystalline and free from preferred orientations.

The characterization of powders was carried out by means of a high resolution scanning electron microscope (JEOL-JSM 840) which enables morphological observations of microstructures and elemental analysis. In the secondary electron image mode, it provides 4 nm resolution and also flicker-free, still image magnification capabilities from 10X up to 300,000X. The representative powder sample was spread on a double-stick adhesive tape. A thin layer of gold was deposited on top of the powder to render them electrically conductive. The sample was then examined under the SEM. The particle size, distribution and morphology were studied by secondary electron mode.

Standardless semiquantitative analysis was performed by means of a computer-controlled EDAX system. Several measurements were made a a low magnification (100X) to obtain the average composition. Specimen homogeneity was assessed by analyzing different regions at high magnification.

EXAMPLE 1

Synthesis of $[Co(CH_3COCH_3)_6][FeCo_3(CO)_{12}]_2$

Prior Art Method

A 300 ml three neck round bottom flask was fitted with a water cooled reflux condenser, a pressure equalizer addition funnel and a magnetic stirrer. Inlet and outlet tubes for argon were provided and the outlet tube was connected to a mercury check valve. The flask was placed in an oil bath. The apparatus was repeatedly purged with argon and evacuated on the high vacuum. Dicobalt octacarbonyl 19.63 g (0.057 mol) and 10.34 g of iron pentacarbonyl (0.053 mol) were introduced into the flask under a stream of argon. A 95 ml portion of acetone was introduced into the flask through an addition funnel. The oil bath was heated to 40° C. and the reaction mixture stirred vigorously. The bath was maintained at 40° C. for 4 hours and then at 60° C. for 14 hours. At 60° C., there was a significant amount of gas evolution. At the end of 14 hours, a reddishbrown solution remained in the flask. The solvent and excess $Fe(CO)_5$ were removed under reduced pressure on the high vacuum and condensed in traps maintained at $-78°$ C. About 40 g (0.026 mol) of $[Co(CH_3COCH_3)_6][FeCo_3(CO)_{12}]_2$ remained in the flask as a hard block solid.

EXAMPLE 2

Synthesis of $HFeCo_3(CO)_{12}$

Prior Art Method

A 5.26 g (0.0035 mol) sample of the product of Example 1 was dissolved in 100 ml of deoxygenated water and filtered in an argon atmosphere, into a Schlenk flask containing 50 ml of concentrated hydrochloric acid. An immediate formation of a dark purple precipitate was observed while the solution had a pink color. After about 5 hours, the precipitate was filtered and washed with deoxygenated water. The filtered solid was dried under reduced pressure in the presence of KOH. About 3.5 g of $HFeCo_3(CO)_{12}$ was obtained. A small amount of this was crystallized from warm toluene in an atmosphere of argon. Shiny black needle like crystals were obtained after a week at $-10°$ C. $HFeCo_3(CO)_{12}$ was identified by IR spectroscopy and XRD.

IR $(CCl_4)$ $CO(cm^{-1})$: 1883(s); 1986(s); 2029(s); 2052(vs).

XRD: $d(Å)$ 7.11(100); 6.79(49); 6.43(22); 5.87(15); 2.84(13); 2.78(13); 2.75(9).

Analysis: Calculated for $HFeCo_3C_{12}O_{12}$: Fe9.81% Found: 9.73% Yield: 90%

EXAMPLE 3

Thermolysis of a $HFeCo_3(CO)_{12}$ and $Fe(CO)_5$ Mixtures $HFeCo_3(CO)_{12}$ (0.11 g, 0.0002 mole) and 1.2 ml (1.68 g, 0.0086 mol) of iron pentacarbonyl were placed in a Schlenk flask purged with argon. The Schlenk flask was connected to a mercury over pressure bubbler. The mixture was stirred magnetically and heated on an oil bath for 45 minutes at 80° C. Evolution of gas was observed, possibly carbon monoxide. The flask was cooled to room temperature and the unreacted $Fe(CO)_5$ removed under vacuum.

EXAMPLE 4

Pyrolysis of $HFeCo_3(CO)_{12}$ $HFe(Co_3(CO)_{12}$ was transferred quickly to an alumina boat and the boat to a quartz tube which had been flushed with argon gas for 30 minutes. The quartz tube was heated in an electrical tube furnace from ambient to final temperatures. Pyrolysis was connected in an argon flow at 300° C. for 45 minutes. Maximum gas evolution from the sample was observed at this temperature. A grey powder was left in the boat.

EXAMPLE 5

The process of Example 4 was carried out with the same result except that nitrogen was substituted for the argon gas.

EXAMPLE 6

The process of Example 4 was carried out with ramping of the temperature up to 1000° C. after the initial heating at 300° C.

A summary of the conditions of synthesis of metal powder from metal organic clusters, along with their characterization data is shown in Table I.

TABLE I

| Example | Starting Materials | Processing |
|---|---|---|
| 7 | $HFeCo_3(CO)_{12}$ | Pyrolysed in argon at 300° C. for 45 minutes. A second portion was pyrolysed at 330° C. in Nitrogen for 45 min. Yield 31.45% |

Note:
The X-ray diffraction pattern of the resulting pyrolysed powders is different from anything listed. It is not readily amendable for structure determination owing to the presence of only a few diffraction peaks.

| | | |
|---|---|---|
| 8 | $[Co(CH_3COCH_3)_6]$ $[FeCo_3(CO)_{12}]_2$ | Pyrolyzed in argon at 330° C. for 1 hour Yield 30.95% |

Note:
A wide range of powders from 10 um to 200 um in size were obtained. The magnified SEM micrographs reveal coarse, elongated and porus particles. The semi-quantitative EDAX analysis indicated an average Fe:Co ratio of 1 to 3.

| | | |
|---|---|---|
| 9 | $HFeCo_3(CO)_{12}$ 0.11 g and $Fe(CO)_5$ 1.2 ml | Heated at 80° C. in argon for 45 minutes. Residual powder was pyrolysed at 350° C. for 1 hour under argon. Yield 91.86% |

Note:
Fine and homogeneous particles of 1 um to 10 um in size. Average composition of Fe:Co is equal to 1 to 3.

| | | |
|---|---|---|
| 10 | $HFeCo_3(CO)_{12}$ .13 g. and $Fe(CO)_5$ 2 ml. | Components were pyrolysed at 138° C. in argon for 45 minutes and excess $Fe(CO)_5$ removed by vacumn |

TABLE I-continued

| Example | Starting Materials | Processing |
|---|---|---|
| | | distillation. Yield 99.94% |

Note:
Particles finer than 4 um and in the range of 1 to 4 um. EDAX analysis conducted randomly on several batches indicated Fe:Co ratio of 2:1. Powers were highly magnetic.

| 11 | Product of Example 10 | Pyrolysed in argon at 350° C. for 1 hour. Yield 67% |

Note:
Very fine and homogenous powders sizes ranging from 0.2 um to 2 um were obtained. The ratio of Fe:Co was 2 to 1. The composition had magnetic properties.

| 12 | $HFeCo_3(CO)_{12}$ and $Fe(CO)_5$ | Sample was heated under controlled atmosphere in a pressure tube at 138° C. for 2 hours. |

Note:
Fine powder in the size range of 0.2 to 2 um. The ratio of Fe:Co was 1 to 3.

It will be apparent to those skilled in the art that various modifications can be made to the processes described herein above without departing from the spirit and scope of the invention. Accordingly such modifications are intended to be within the scope of the claims.

What is claimed is:

1. A process for producing iron-cobalt organometallic clusters which comprises reacting a mixture of iron pentacarbonyl and $HFeCo_3(CO)_{12}$ in an inert gas.

2. The process of claim 1 wherein the inert gas is argon.

3. The process of claim 1 wherein the inert gas is nitrogen.

4. The process of claim 2 wherein the organometallic clusters are subjected to pyrolysis at a temperature of from about 130° C. to about 400° C.

5. A process for producing iron-cobalt alloy powder by pyrolysis of iron-cobalt organometallic clusters at a temperature of about 130° C. to about 400° C.

6. A process for producing iron-cobalt powders which comprises reacting iron pentacarbonyl with $HFeCo_3CO_{12}$, then removing the excess iron pentacarbonyl and subjecting the composition of pyrolysis.

7. The process of claim 6 wherein the reaction is carried out at a temperature of about 70° C. to about 100° C. and the pyrolysis is carried out at a temperature of about 130° C. to about 400° C.

8. The reaction of claim 6 wherein the process is carried out at about 80° C. in an argon atmosphere for about 45 minutes and the pyrolysis is carried out at about 350° C. for about one hour.

9. The reaction of claim 6 wherein the process was carried out under pressure at about 138° C. for about two hours.

10. The product formed by the process of claim 1.
11. The product formed by the process of claim 4.
12. The product formed by the process of claim 5.
13. The product formed by the process of claim 6.
14. The product formed by the process of claim 7.
15. The product formed by the process of claim 8.
16. The product formed by the process of claim 9.

* * * * *